United States Patent [19]
Oka et al.

[11] Patent Number: 6,092,786
[45] Date of Patent: Jul. 25, 2000

[54] GATE VALVE

[75] Inventors: Hiroki Oka, Yamanashi-ken; Yoji Iizuka, Tokyo; Kenichi Nakagawa, Yamanashi-ken; Jun Hirose, Yamanashi-ken; Tatsuya Nakagome, Yamanashi-ken; Hiroshi Koizumi, Yamanashi-ken; Hiroshi Ohno, Tokyo, all of Japan

[73] Assignees: Tokyo Electron Limited; V Tex Corporation, both of Japan

[21] Appl. No.: 09/060,546

[22] Filed: Apr. 15, 1998

[30] Foreign Application Priority Data

Apr. 18, 1997 [JP] Japan ................................ 9-101785

[51] Int. Cl.$^7$ .............................. F16K 3/18; H01L 21/66
[52] U.S. Cl. ........................................... 251/193; 251/330
[58] Field of Search ............................... 251/193; 137/330

[56] References Cited

U.S. PATENT DOCUMENTS

| | | | |
|---|---|---|---|
| 4,077,552 | 3/1978 | Lothmann | 251/193 X |
| 4,199,085 | 4/1980 | Watts et al. | 251/193 X |

Primary Examiner—John Fox
Attorney, Agent, or Firm—Graham & James LLP

[57] ABSTRACT

Provided is a gate valve for opening and closing an aperture formed in a body of a chamber and designed so that an object is loaded into or unloaded from the chamber, comprising a lift mechanism provided on a side portion of the chamber body, a supporting portion supported by a lift mechanism for up-and-down motion, a valve plate supported by the supporting portion and movable between a closed position such as to close the aperture of the chamber body and an open position such that the valve plate is separated from the aperture to leave the aperture open as the supporting portion is moved up and down by the lift mechanism, and a separating mechanism for allowing the valve plate to move to a position ahead of the aperture so that the valve plate is separated from the aperture.

9 Claims, 8 Drawing Sheets

GATE VALVE

BACKGROUND OF THE INVENTION

The present invention relates to a gate valve for isolating an atmosphere gas in a chamber of a vacuum treatment apparatus for treating objects, such as liquid crystal substrates (LCD substrates), semiconductor wafers, etc., from the outside.

In a conventional etching apparatus, for example, to-be-treated objects such as LCD substrates are set in a cassette chamber. These objects are taken out one after another from the cassette chamber and loaded into a load-lock chamber, which adjoins the cassette chamber, by means of a transportation unit in the load-lock chamber. When the LCD substrates are thus loaded into the load-lock chamber, an atmosphere gas in this chamber is set at negative pressure. Thereafter, the substrates are transported from the negative-pressure chamber into a treatment chamber by means of the transportation unit. According to this transportation method, however, the load-lock chamber is set at negative pressure every time one of the LCD substrates is taken out from the cassette chamber, so that the transportation time is very long.

FIGS. 6 to 10 show an example of an etching apparatus that facilitates reduction of the transportation time. In this apparatus, a plurality of untreated LCD substrates are collectively stored in a buffer mechanism in the load-lock chamber. The substrates in the buffer mechanism are taken out one after another and transported into a treatment chamber to be treated therein. The treated substrates are returned to an original position in the buffer mechanism. Since the LCD substrates are not transported one by one between the cassette chamber and the load-lock chamber, the total transportation time is shortened for it. This etching apparatus will now be described in detail with reference to the accompanying drawings.

Figure 6:
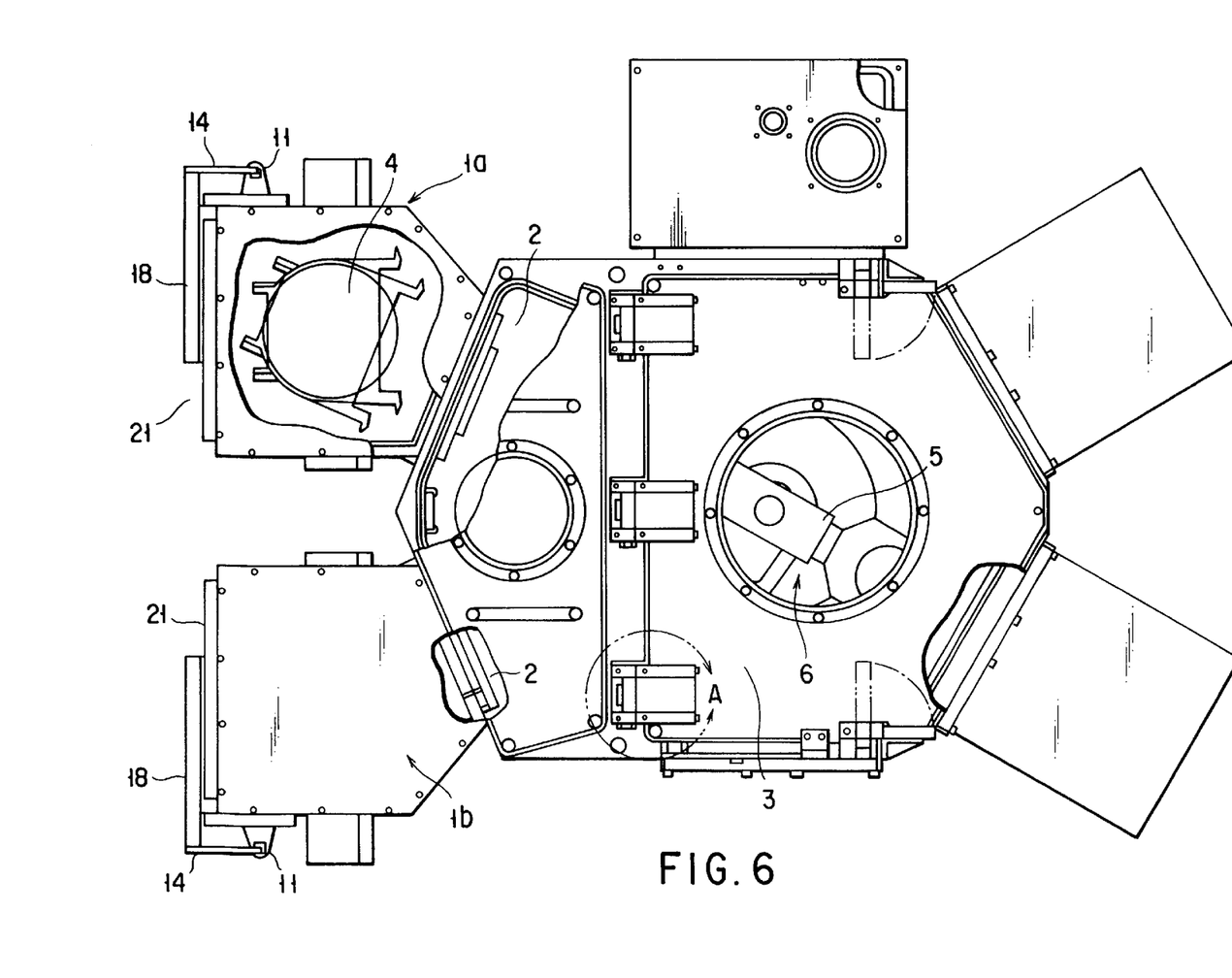
FIG. 6 is a plan view of a conventional etching apparatus.
Figure 7:
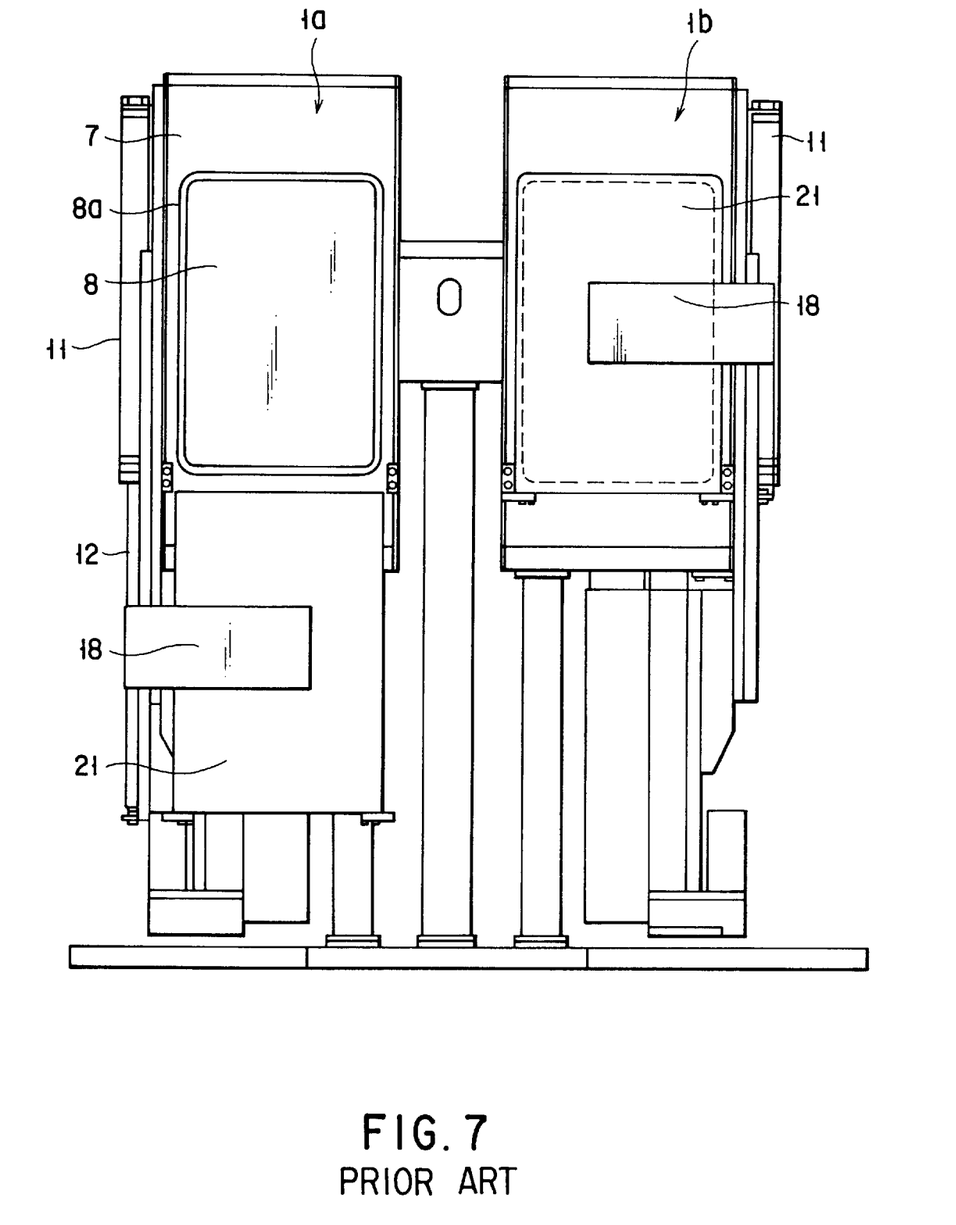
FIG. 7 is a front view of a chamber constituting the etching apparatus of FIG. 6.

As shown in FIGS. 6 and 7, the etching apparatus comprises first and second chambers 1a and 1b for etching the objects and a load-lock chamber 3 that is airtightly connected to the chambers 1a and 1b through an open-close mechanism 2. The mechanism 2 is opened or closed when pressures in the chambers 1a, 1b and 3 are adjusted to negative values, individually. The load-lock chamber 3 contains a transportation mechanism 6, which includes a transportation arm 5 for transporting an object 4 to be treated to a predetermined position, a buffer mechanism (not shown) for temporarily holding the object 4 to be transported. Since the chambers 1a and 1b have the same construction, only the first chamber 1a will be described below.

As shown in FIGS. 7 to 10, the first chamber 1a has a chamber body 7 having a profile in the form of a rectangular box. The front face of the chamber body 7 is provided with a rectangular aperture 8 and an O-ring 8a surrounding the same. The aperture 8 is opened or closed by means of a gate valve that is attached to the chamber body 7 for operation. The gate valve includes a mounting plate 9 that is attached to the left-hand side portion of the chamber body 7. The plate 9 vertically extends so that its lower end portion extends downward beyond the lower part of the chamber body 7. A vertically extending linear guide 10 is fixed to the mounting plate 9. Behind the guide 10, an air cylinder 11, which constitutes a lift mechanism, is fixed to the mounting plate 9. In this case, the air cylinder 11 is directed plumb so that its expansion rod 12 can extend or contract in the vertical direction. A bracket 14 is fixed to the distal end portion of the rod 12 by means of a free joint 13 so as to project forward in the horizontal direction. Fixed to the front end portion of the bracket 14 is a coupling member 15, which extends vertically upward. A linear block 16, which is slidably attached to the linear guide 10, is fixed to the upper end portion of the member 15 by means of a plurality of bolts 17.

Figure 8:
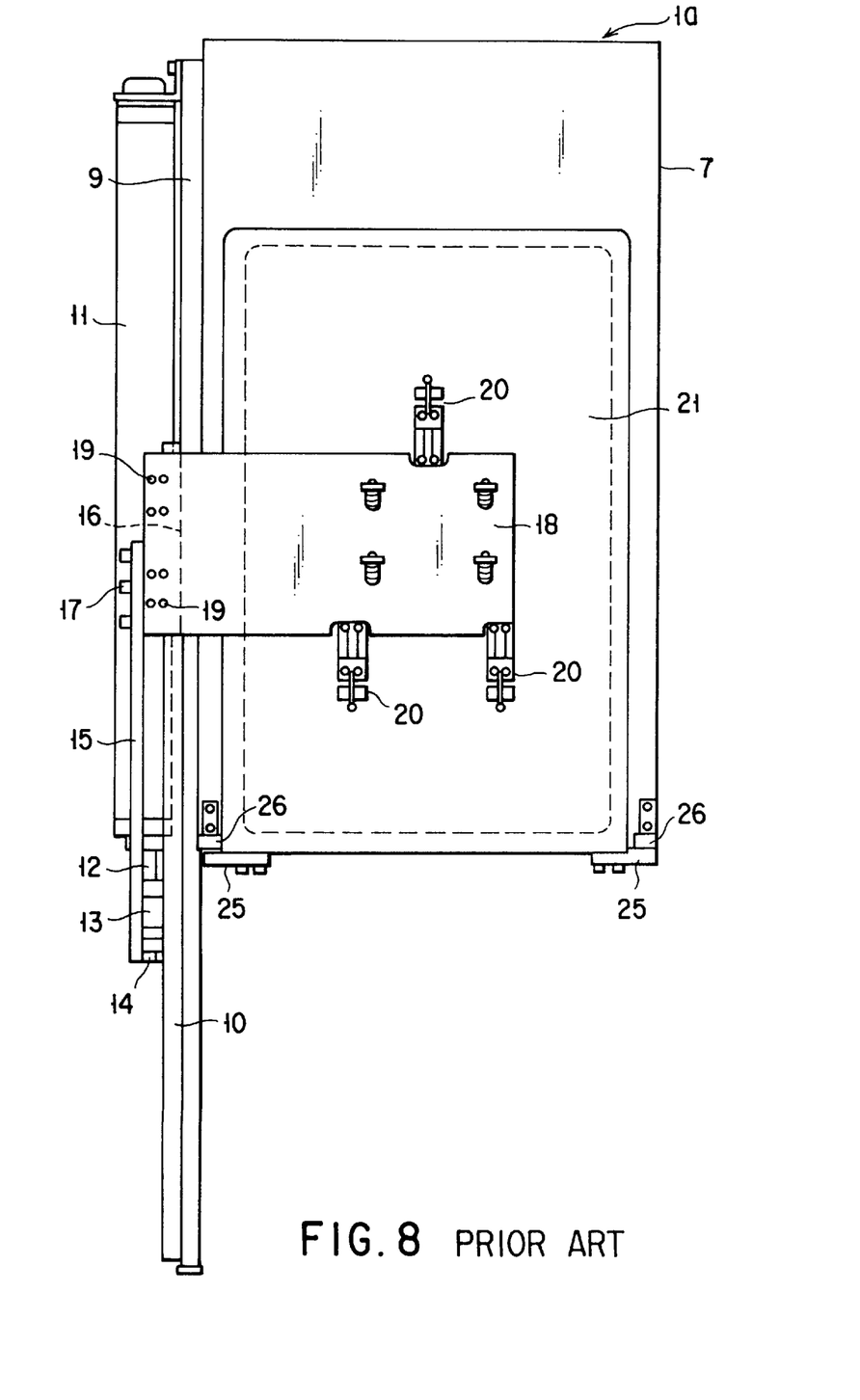
FIG. 8 is an enlarged front view of a gate valve attached to the chamber of FIG. 7.
Figure 9:
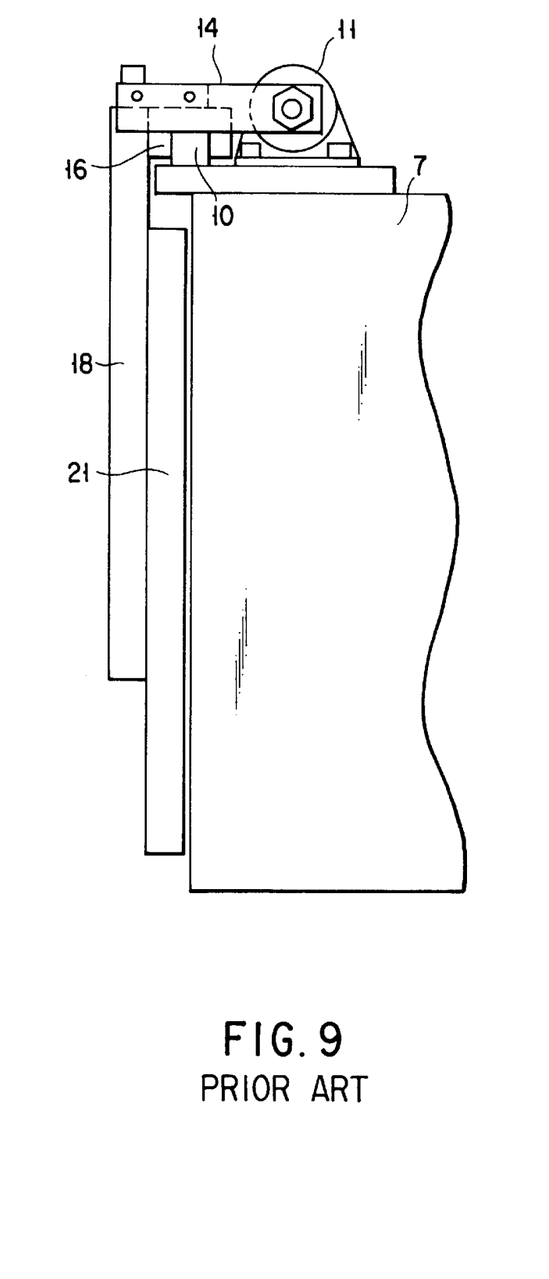
FIG. 9 is a bottom view of the gate valve shown in FIG. 8.
Figure 10:
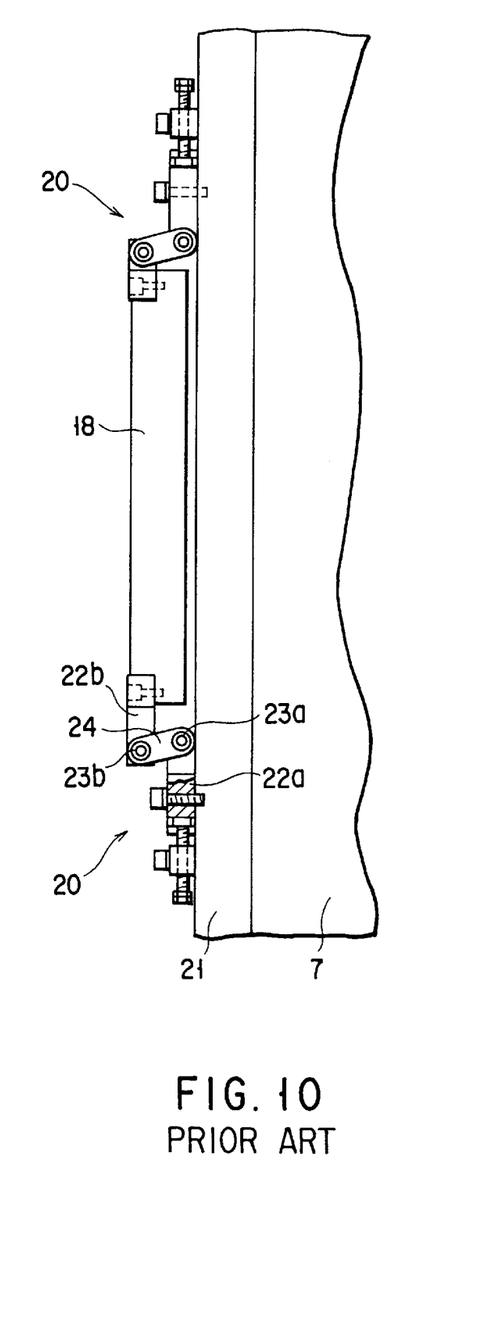
FIG. 10 is a side view of the gate valve shown in FIG. 8.

The proximal end portion of a valve plate supporting member 18, having the form of a rectangular plate, is fixed to a side face of the linear block 16 by means of a plurality of bolts 19. The distal end portion of the member 18 extends toward the front face of the chamber body 7. Thus, the valve plate supporting member 18 is supported like a cantilever on the linear block 16.

A valve plate 21 for opening and closing the aperture 8 of the chamber body 7 is supported on the valve plate supporting member 18 by means of a plurality of link mechanisms 20. The link mechanisms 20 are arranged individually in one position at the upper part of the supporting member 18 and two positions at the lower part of the member 18. As shown in detail in FIG. 10, each link mechanism 20 is composed of a link receiver 22b attached to the supporting member 18, a link receiver 22a attached to that part of the valve plate 21 which corresponds to the receiver 22b, and a link 24 having its opposite end portions rockably coupled to the receivers 22a and 22b by means of pivot pins 23a and 23b, respectively. As shown in FIG. 8, lugs 25 protrude sideways from the opposite side portions of the lower end of the valve plate 21, individually. Roller stoppers 26, which can engage their corresponding lugs 25, are provided individually on the opposite side portions of the lower end of the chamber body 7 that face the lugs 25.

As the expansion rod 12 of the air cylinder 11 is extended or contracted, in this arrangement, the linear block 16 is vertically slid along the linear guide 10 by means of the bracket 14 and the coupling member 15. Accordingly, the valve plate supporting member 18, which is fixed to the block 16, and the valve plate 21, which is supported by the member 18, also move vertically. When the supporting member 18 ascends together with the valve plate 21 so that the plate 21 faces the aperture 8 of the chamber body 7, the lugs 25 engage their corresponding stoppers 26. When the supporting member 18 further ascends in this state, the link 24 of each link mechanism 20 rocks around the pivot pins 23a and 23b, since the valve plate 21 is restrained from ascending by the lugs 25 and the stoppers 26 in engagement with one another. Guided by the roller stoppers 26, moreover, the valve plate 21 moves away from the valve plate supporting member 18. As this is done, the valve plate 21 is pressed against the O-ring 8a on the front face of the chamber body 7, so that the aperture 8 is hermetically closed by the plate 21. When the valve plate supporting member 18 is lowered as the air cylinder 11 operates with the aperture 8 closed by the valve plate 21, the lugs 25 are disengaged from their corresponding roller stoppers 26, and the link 24 of each link mechanism 20 is rocked. At the same time, the valve plate 21 descends away from the front face of the chamber body 7, so that the aperture 8 of the body 7 is opened.

The inside of the valve plate 21, which faces the interior of the chamber body 7, can be contaminated by gases and the like in the body 7. Accordingly, the inside of the plate 21 must be cleaned at regular intervals. The valve plate 21 can be cleaned when the aperture 8, e.g., that of the first chamber 1a on the left-hand side of FIG. 7, is opened so that the plate 21 is situated under the front face of the chamber body 7. However, a drive unit for an elevator mechanism (not shown) in the chamber body 7 is located in the lower part of the body 7, and makes it difficult to clean the inside of the valve plate 21. In cleaning the inside of the plate 21, therefore, an operator is expected to make a reach for the rear side of the chamber body 7 from the front side. In this state, however, the operator cannot access all the corners of the inside of the valve plate 21, and therefore, cannot clean it thoroughly. Before starting the cleaning, therefore, the operator loosens the bolts 19, which couple the linear block 16 and the valve plate supporting member 18, and removes the valve plate 21 together with member 18 from the chamber body 7. Since the member 18 and the plate 21 are weighty, it is hard and dangerous for one operator to support and clean them.

BRIEF SUMMARY OF THE INVENTION

The object of the present invention is to provide a gate valve, which allows the inside of a valve plate to be cleaned easily and safely.

The object of the invention can be achieved by a gate valve constructed as follows. The gate valve, which is designed to open and close an aperture formed in a body of a chamber and designed so that an object is loaded into or unloaded from the chamber, comprises: a lift mechanism provided on a side portion of the chamber body; a supporting portion supported by a lift mechanism for up-and-down motion; a valve plate supported by the supporting portion and movable between a closed position such as to close the aperture of the chamber body and an open position such that the valve plate is separated from the aperture to leave the aperture open as the supporting portion is moved up and down by the lift mechanism; and a separating mechanism for allowing the valve plate to move to a position ahead of the aperture so that the valve plate is separated from the aperture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will now be described with reference to the accompanying drawings.

Figure 1:
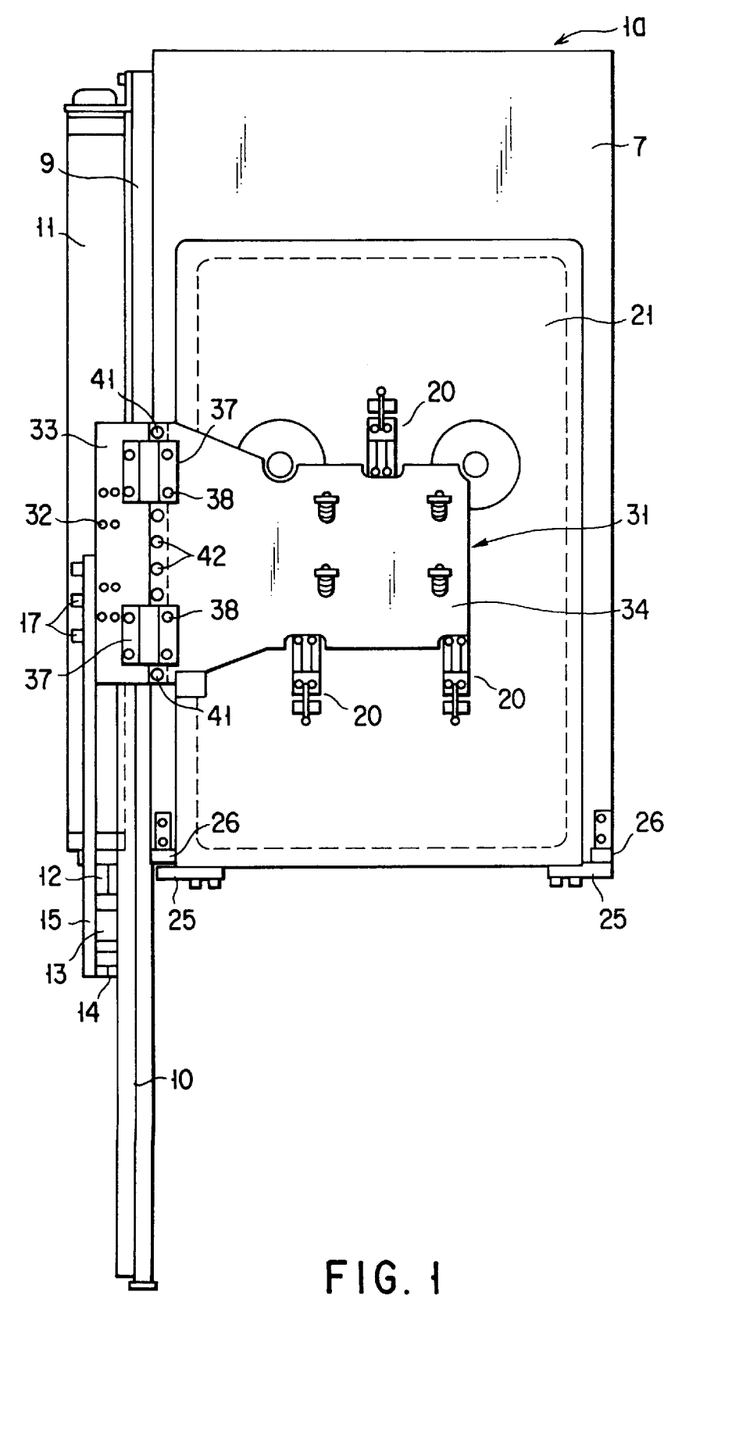
FIG. 1 is a front view of a chamber provided with a gate valve according to a first embodiment of the present invention.
Figure 2:
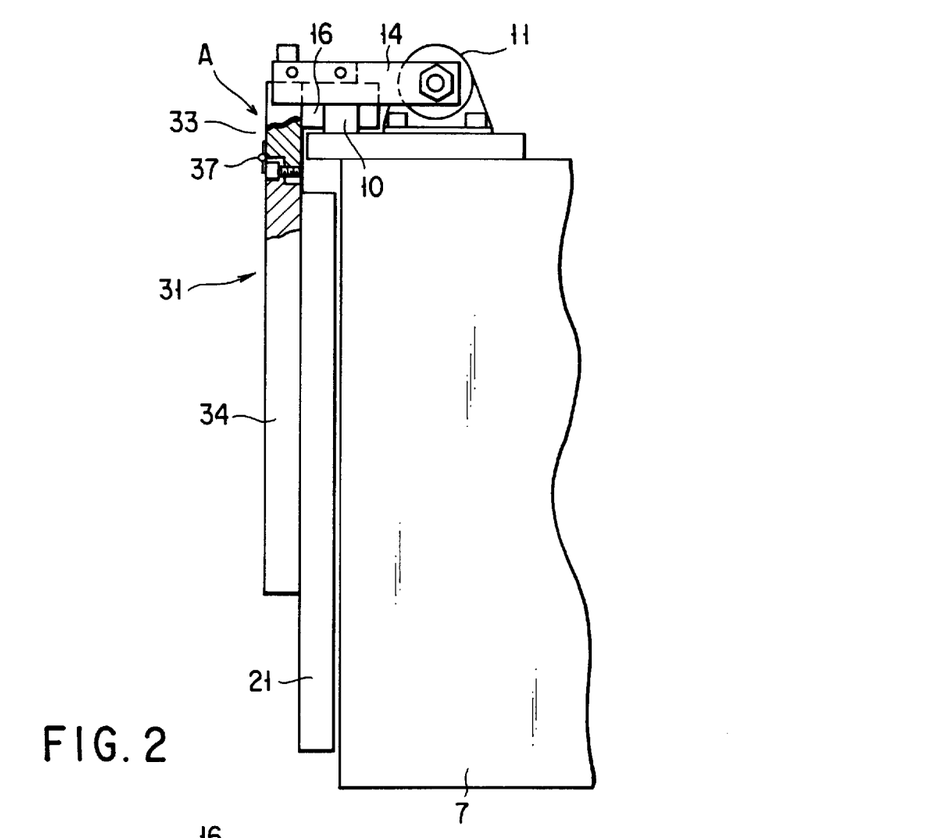
FIG. 2 is a bottom view of the chamber of FIG. 1.

FIGS. 1 to 4C show a first embodiment of the present invention. FIG. 1 shows a first chamber 1a. As shown in FIG. 6, the first chamber 1a constitutes an etching apparatus, in conjunction with a second chamber 1b adjacent thereto and a load-lock chamber 3 that is airtightly connected to the chambers 1a and 1b through an open-close mechanism 2. The mechanism 2 is opened or closed when pressures in the chambers 1a, 1b and 3 are adjusted to negative values, individually. The load-lock chamber 3 contains a transportation mechanism 6, which includes a transportation arm 5 for transporting an object 4 to be treated to a predetermined position, a buffer mechanism (not shown) for temporarily holding the object 4 to be transported.

Figure 4A:
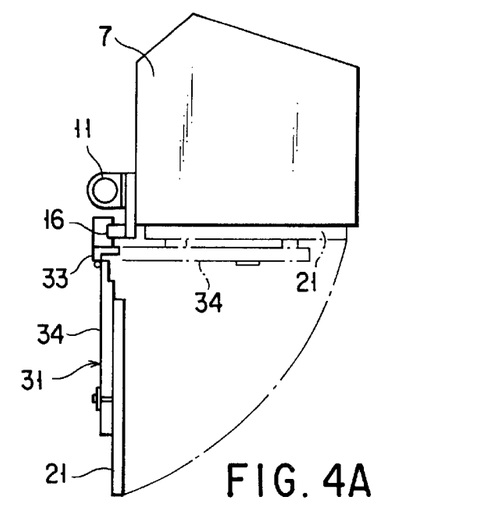
FIG. 4A is a plan view of the chamber with a valve plate of the gate valve rocked.
Figure 4B:
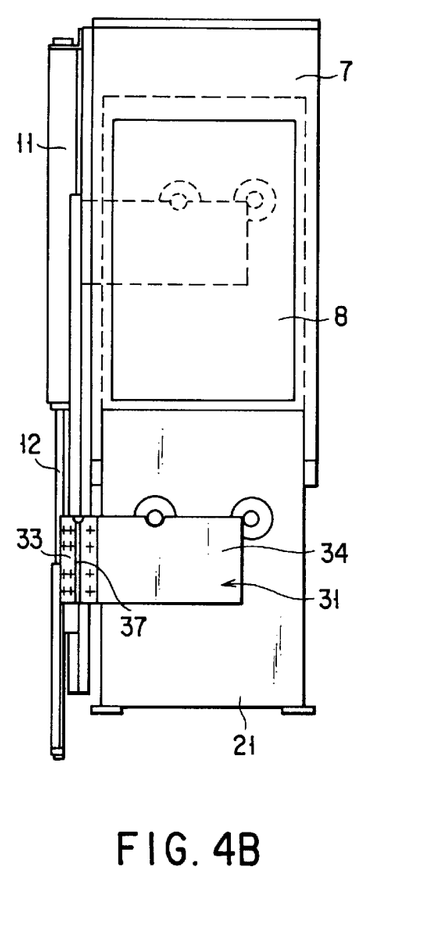
FIG. 4B is a front view of the chamber with the valve plate of gate valve situated under the body of the chamber so that an aperture of the chamber body is open.
Figure 4C:
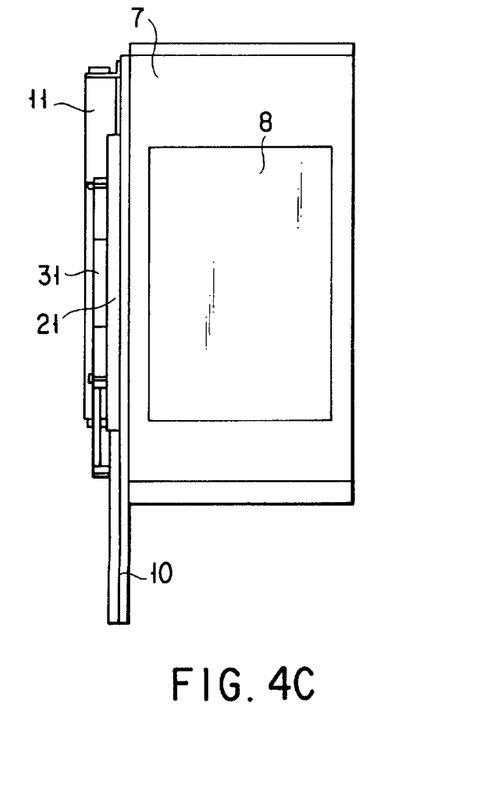
FIG. 4C is a front view of the chamber in the state shown in FIG. 4A.

As shown in FIG. 1, the first chamber 1a has a chamber body 7 having a profile in the form of a rectangular box. Formed in the front face of the chamber body 7, as shown in FIGS. 4B and 4C, is a rectangular aperture 8 through which the object to be treated is loaded into or unloaded from the chamber 1a. The aperture 8, which is surrounded by an O-ring 8a, is opened or closed by means of a gate valve that is attached to the chamber body 7 for operation. The gate valve includes a mounting plate 9 that is attached to the left-hand side portion of the chamber body 7. The plate 9 vertically extends so that its lower end portion extends downward beyond the lower part of the chamber body 7. A vertically extending linear guide 10 is fixed to the mounting plate 9. Behind the guide 10, an air cylinder 11, which constitutes a lift mechanism, is fixed to the mounting plate 9. In this case, the air cylinder 11 is directed plumb so that its expansion rod 12 can extend or contract in the vertical direction. A bracket 14 is fixed to the distal end portion of the rod 12 by means of a free joint 13 so as to project forward in the horizontal direction. Fixed to the front end portion of the bracket 14 is a coupling member 15, which extends vertically upward. A linear block 16, which is slidably attached to the linear guide 10, is fixed to the upper end portion of the member 15 by means of a plurality of bolts 17.

A valve plate supporting member 31 is fixed to the linear block 16 by means of a plurality of bolts 32. The supporting member 31, which is formed of a rectangular metal plate, is divided into two parts, a proximal-side supporting member 33, having its proximal end portion fixed to the block 16 by means of the bolts 32, and a distal-side supporting member 34 supporting a valve plate 21.

Figures 3A, 3B:
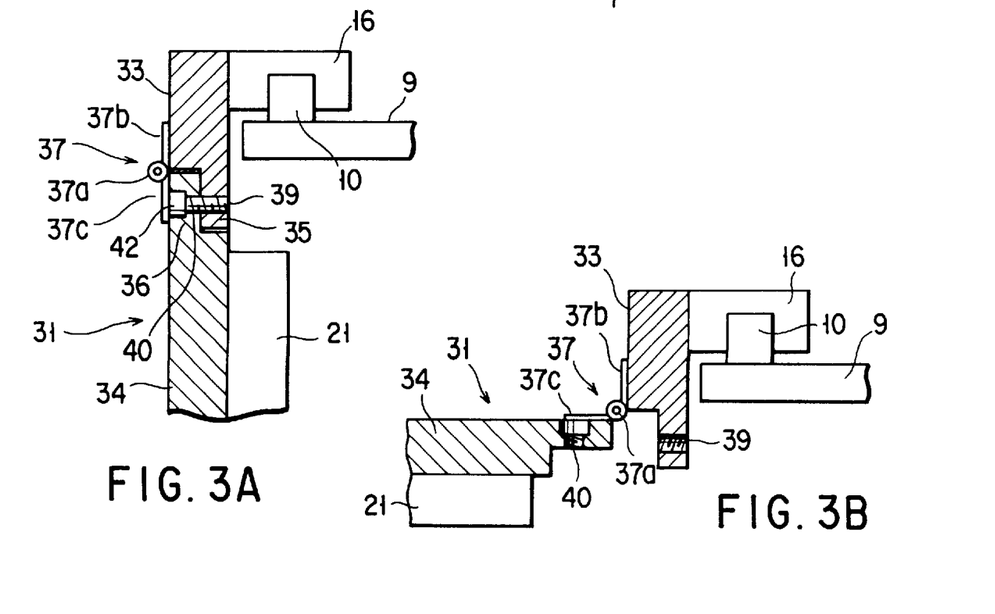
FIG. 3A is an enlarged sectional view showing a section A of FIG. 2 in a fastened state.
FIG. 3B is an enlarged sectional view showing the section A of FIG. 2 in a rocked state.

As shown in detail in FIG. 3A, the distal end portion of the proximal-side supporting member 33 is provided with a first step portion 35. The step portion 35 is formed by notching the front face of the distal end portion of the member 33. Further, the proximal end portion of the distal-side supporting member 34 is provided with a second step portion 36, which mates with the first step portion 35. The step portion 36 is formed by notching the inside (rear face) of the proximal end portion of the member 34. In the state of FIG. 3A in which the first and second step portions 35 and 36 are fully in engagement, the front and rear faces of the proximal-side supporting member 33 are flush with those of the distal-side supporting member 34, respectively.

The distal end portion of the proximal-side supporting member 33 and the proximal end portion of the distal-side supporting member 34 are rockably coupled to each other by means of two hinge mechanisms 37 that are spaced vertically. Each hinge mechanism 37 is composed of a vertically extending pivot 37a and a pair of hinge pieces 37b and 37c that are rockable around the pivot 37a. The one hinge piece 37b is fixed to the proximal-side supporting member 33 by means of fixing screws 38, while the other hinge piece 37c is fixed to the distal-side supporting member 34 by means of fixing screws 38.

The first step portion 35 of the proximal-side supporting member 33 is provided with six tapped holes 39, which are located individually at the upper and lower portions of each hinge mechanism 37 and between the two hinge mechanisms 37. Stepped bolt holes 40 are bored through those parts of the second step portion 36 of the distal-side supporting member 34 which face the tapped holes 39, individually. Fastening bolts 42 are passed individually through the four bolt holes 40 between the two hinge mechanisms 37, while positioning bolts (fastening members) 41 having a taper portion are passed individually through the two remaining bolt holes 40 (ones on the upper side of the upper hinge mechanism 37 and the lower side of the lower hinge mechanism 37). When these bolts 41 and 42 are screwed individually into the tapped holes 39 in the first step portion 35, the proximal- and distal-side supporting members 33 and 34 are coupled integrally to each other. As this is done, the front and rear faces of the proximal-side member 33 are flush with those of the distal-side member 34, respectively.

The valve plate 21 for opening and closing the distal-side supporting member 34 by means of a plurality of link mechanisms 20. The link mechanisms 20 are arranged individually in one position at the upper part of the distal-side supporting member 34 and two positions at the lower part of the member 34. Each link mechanism 20, like the one shown in FIG. 10, is composed of a link receiver 22b attached to the distal-side supporting member 34, a link receiver 22a attached to that part of the valve plate 21 which corresponds to the receiver 22b, and a link 24 having its opposite end portions rockably coupled to the receivers 22a and 22b by means of pivot pins 23a and 23b, respectively. As shown in FIG. 1, lugs 25 protrude sideways from the opposite side portions of the lower end of the valve plate 21, individually. Roller stoppers 26, which can engage their corresponding lugs 25, are provided individually on the opposite side portions of the lower end of the chamber body 7 that face the lugs 25.

The following is a description of the operation of the gate valve thus designed to open and close the aperture 8.

As the expansion rod 12 of the air cylinder 11 is extended or contracted, in the gate valve having the aforementioned construction, the linear block 16 is vertically slid along the linear guide 10 by means of the bracket 14 and the coupling member 15. Accordingly, the valve plate supporting member 31, which is fixed to the block 16, and the valve plate 21, which is supported by the member 31, also move vertically. More specifically, when the expansion rod 12 of the air cylinder 11 is contracted from a position such that the valve plate 21 is situated under the chamber body 7 with the aperture 8 open, as indicated by full line in FIG. 4B, the linear block 16 is caused to ascend along the linear guide 10 by the bracket 14 and the coupling member 15. Accordingly, the valve plate supporting member 31, fixed to the block 16, also ascends integrally with the valve plate 21. When the valve plate 21 rises for a given distance such that it faces the aperture 8 of the chamber body 7, the lugs 25 engage their corresponding stoppers 26. When the supporting member 31 further ascends in this state, the link 24 of each link mechanism 20 rocks around the pivot pins 23a and 23b, since the valve plate 21 is restrained from ascending by the lugs 25 and the stoppers 26 in engagement with one another. Guided by the roller stoppers 26, moreover, the valve plate 21 moves away from the valve plate supporting member 31. As this is done, the valve plate 21 is pressed against the O-ring 8a on the front face of the chamber body 7, so that the aperture 8 is hermetically closed by the plate 21 (indicated by broken line in FIG. 4B). Thus, an atmosphere gas in the chamber body 7 is isolated from the outside by the valve plate 21.

If the rod 12 of the air cylinder 11 is extended with the aperture 8 closed by the valve plate 21, on the other hand, the linear block 16 is caused to descend along the linear guide 10 by the bracket 14 and the coupling member 15. When the valve supporting member 31, fixed to the block 16, descends as this is done, the valve plate 21 starts also to descend. Accordingly, the lugs 25 are disengaged from their corresponding roller stoppers 26, and the link 24 of each link mechanism 20 is rocked. As the link 20 rocks in this manner, the valve plate 21 descends away from the front face of the chamber body 7, so that the aperture 8 of the body 7 is opened.

Thus, in a normal state of use, the valve plate 21 ascends or descends parallel to the front face of the chamber body 7, thereby causing the aperture 8 of the body 7 to close or open, as the rod 12 of the air cylinder 11 contracts or extends.

The following is a description of the way the inside of the valve plate 21 is cleaned.

The inside of the valve plate 21, which faces the interior of the chamber body 7, can be contaminated by gases and the like in the body 7. Accordingly, the inside of the plate 21 must be cleaned at regular intervals. In cleaning the valve plate 21, the bolts 41 and 42, which connect the proximal- and distal-side supporting members 33 and 34, are loosened first. When this is done so that the supporting members 33 and 34 are unfastened, the distal-side member 34 is allowed to rock around the respective pivots 37a of the hinge mechanisms 37 with respect to the proximal-side member 33. Thus, the inside of the valve plate 21, which is supported by the distal-side supporting member 34, can be separated wide from the front face of the chamber body 7 by rocking the member 34 and the plate 21 forward through 90° (see FIGS. 3B, 4A and 4C). In this state, the inside of the valve plate 21 can be easily cleaned all over. With this arrangement in which the valve plate supporting member 31 and the valve plate 21, weighty members, are rockably supported by means of the hinge mechanisms 37, the member 31 and the plate 21 need not be removed from the chamber body 7 before they are cleaned, thus ensuring safe cleaning operation.

After the cleaning, the proximal- and distal-side supporting members 33 and 34 are restored to their original coupled state. To attain this, the distal-side supporting member 34 is first rocked around the respective pivots 37a of the hinge mechanisms 37 with respect to the proximal-side member 33. By doing this, the first and second step portions 35 and 36 are caused to engage each other so that the front and rear faces of the proximal-side member 33 are flush with those of the distal-side member 34, respectively. In this state, the positioning bolts 41 are screwed into their corresponding tapped holes 39 through the upper and lower stepped bolt holes 40, individually. Thereafter, the fastening bolts 42 are screwed into their corresponding tapped holes 39 through the four remaining bolt holes 40, individually, whereupon the proximal- and distal-side supporting members 33 and 34 are coupled integrally to each other (see FIG. 3A). Thus, the valve plate 21 is supported parallel to the front face of the chamber body 7.

Figure 5A:
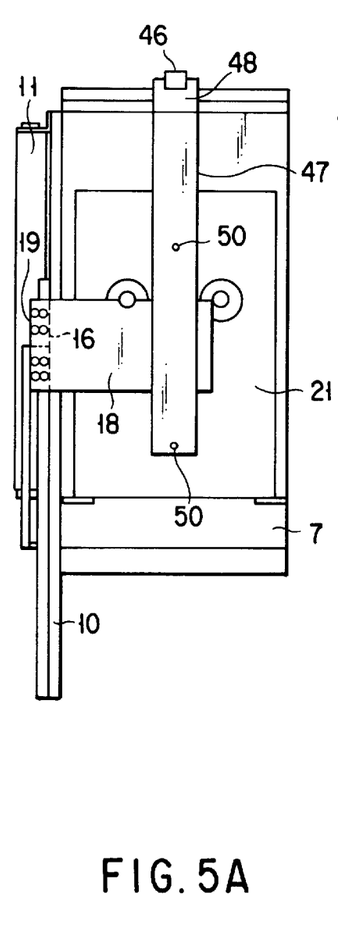
FIG. 5A is a front view of a chamber provided with a gate valve according to a second embodiment of the invention.
Figure 5B:
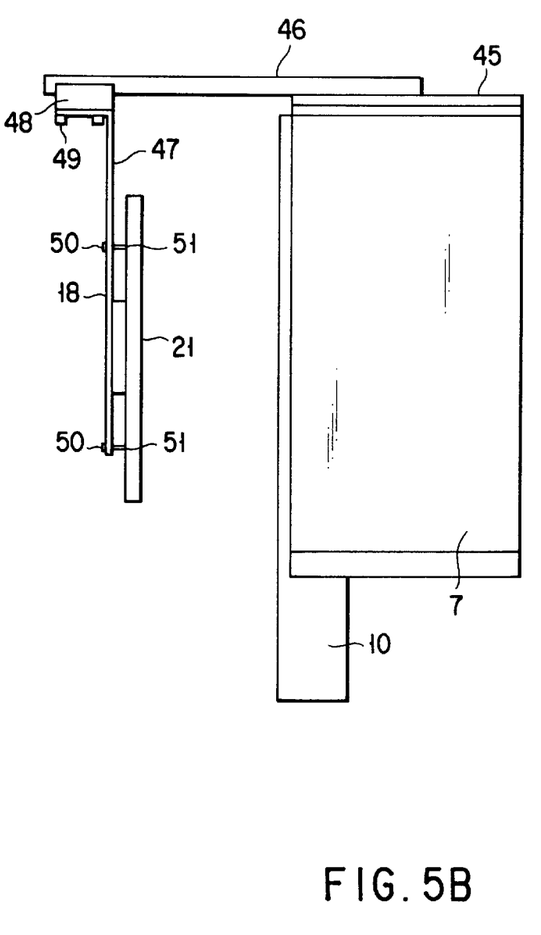
FIG. 5B is a side view of the chamber shown in FIG. 5A.

FIGS. 5A and 5B show a second embodiment of the present invention. The present embodiment is an improvement of the arrangement shown in FIGS. 6 to 10. In FIGS. 5 to 10, therefore, like reference numerals refer to the same or common components throughout the several views, and a description of those components is omitted.

A longitudinally extending guide rail 45 is fixed to the center of the upper surface of the chamber body 7. A valve plate holder (slider) 46, which is formed of a rod member, is supported on the rail 45 for longitudinal sliding motion. As the holder 46 slides forward along the guide rail 45, its distal end portion can project ahead of the chamber body 7 (see FIG. 5B). A valve plate holding member 47 is removably attached to the distal end portion of the holder 46. The holding member 47, which has a mounting portion 48 at its upper end portion, is set vertical in front of the chamber body 7 in a manner such that the mounting portion 48 is fixed to the distal end portion of the holder 46 by means of bolts 49. A plurality of mounting bolts 50 are screwed into the intermediate and lower end portions of the holding member 47 in the longitudinal direction thereof from the front side. The valve plate 21 for opening and closing the aperture 8 of the chamber body 7 is provided with tapped holes 51 in which the mounting bolts 50 are screwed individually.

In cleaning the inside of the valve plate 21 in this arrangement, the valve plate holder 46 is first drawn out along the guide rail 45 to the position ahead of the chamber body 7, and the mounting portion 48 of the valve plate holding member 47 is attached to the distal end portion of the holder 46 by means of the bolts 49. Then, the holder 46 is pushed in toward the chamber body 7 so that the holding member 47 is pressed against a valve plate supporting plate 18, and the mounting bolts 50 of the holding member 47 are screwed individually into the tapped holes 51 of the valve plate 21. When this is done, the valve plate 21 is supported on the holder 46 by means of the holding member 47. In this state, a plurality of bolts 19, which couple the linear block 16 and the valve plate supporting member 18, are loosened, and the member 18 is separated from the block 16. Thereupon, the supporting member 18, like the valve plate 21, is held by the valve plate holder 46. When the holder 46 is drawn out along the guide rail 45 to be situated ahead of the chamber body 7 in this state, therefore, the supporting member 18 and the valve plate 21 are separated wide from the front face of the body 7, thereby allowing the inside of the plate 21 to be cleaned. Thus, the inside of the valve plate 21 is ready to be cleaned all over.

In the present embodiment, the valve plate holder 46 is slidably mounted on the guide rail 45 that is attached to the chamber body 7. Alternatively, however, the holder 46 may be removably attached to the chamber body 7 so that it can be removed from the body 7 except when it is cleaned.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A gate valve for opening and closing an aperture formed in a body of a chamber and designed so that an object is loaded into or unloaded from the chamber through the aperture, comprising:

a lift mechanism provided on a side portion of the chamber body;

a supporting portion supported by the lift mechanism for up-and-down motion; and a valve plate supported by the supporting portion and movable between a closed position such as to close the aperture of the chamber body and an open position such that the valve plate is separated from the aperture to leave the aperture open as the supporting portion is moved up and down by the lift mechanism, wherein said supporting portion includes a first supporting member attached to the lift mechanism and a second supporting member supporting the valve plate and rotatably coupled to the first supporting member, and wherein the second supporting member is rotatable with respect to the first supporting member around an axis parallel to an up-and-down direction of the supporting portion.

2. A gate valve according to claim 1, wherein said second supporting member is coupled to the first supporting member with a hinge.

3. A gate valve according to claim 2, wherein said hinge is formed of a pivot and a pair of hinge pieces rotatable around the pivot, the hinge pieces being individually fixed to the first and second supporting members.

4. A gate valve according to claim 1, further comprising rotation restraining means removably attached to the first and second supporting members and restraining the second supporting member from rotating relative to the first supporting member.

5. A gate valve according to claim 4, wherein said rotating restraining means is formed of a plurality of bolts screwed into both of the first and second supporting members.

6. A gate valve according to claim 1, wherein said separating mechanism causes the valve plate to move in the opening direction of the aperture.

7. A gate valve according to claim 6, wherein said separating mechanism includes a slider provided on the chamber body and movable toward a position ahead of the aperture, a holder removably mounted on an end portion of the slider, mounting means for removably mounting the holder on the supporting portion, and coupling means for removably coupling the supporting portion and the lift mechanism.

8. A gate valve for opening and closing an aperture that is formed in a body of a chamber of a vacuum treatment apparatus for performing a predetermined treatment on an object and is designed so that the object is loaded into or unloaded from the chamber through the aperture, comprising:

a lift mechanism provided on a side portion of the chamber body;

a supporting portion supported by the lift mechanism for up-and-down motion; and a valve plate supported by the supporting portion and movable between a closed portion such as to close the aperture of the chamber body and an open position such that the valve plate is separated from the aperture to leave the aperture open as the supporting portion is moved up and down by the lift mechanism, wherein said supporting portion includes a first supporting member attached to the lift mechanism and a second supporting member supporting the valve plate and rotatably coupled to the first supporting member, and wherein the second supporting member is rotatable with respect to the first supporting member around an axis parallel to an up-and-down direction of the supporting portion.

9. A gate valve according to claim 8, wherein said second supporting member is coupled to the first supporting member with a hinge.

* * * * *